(12) United States Patent
Mehler et al.

(10) Patent No.: US 8,076,798 B2
(45) Date of Patent: Dec. 13, 2011

(54) UNINTERRUPTIBLE A/C POWER SUPPLY TRANSFER UNIT

(75) Inventors: Dean L. Mehler, Bel Aire, KS (US); James P. Wiebe, Wichita, KS (US)

(73) Assignee: CRU Acquistion Group, LLC, Vancouver, WA (US)

( * ) Notice: Subject to any disclaimer, the term of this patent is extended or adjusted under 35 U.S.C. 154(b) by 180 days.

(21) Appl. No.: 12/523,967

(22) PCT Filed: Jan. 25, 2008

(86) PCT No.: PCT/US2008/052119
§ 371 (c)(1),
(2), (4) Date: Feb. 1, 2010

(87) PCT Pub. No.: WO2008/092122
PCT Pub. Date: Jul. 31, 2008

(65) Prior Publication Data
US 2010/0141036 A1    Jun. 10, 2010

Related U.S. Application Data

(60) Provisional application No. 60/897,292, filed on Jan. 25, 2007.

(51) Int. Cl.
*H02J 7/00* (2006.01)
*H02J 9/00* (2006.01)
(52) U.S. Cl. .......................................... 307/64
(58) Field of Classification Search .............. 307/64, 307/85, 86, 70, 125
See application file for complete search history.

(56) References Cited

U.S. PATENT DOCUMENTS

| | | | |
|---|---|---|---|
| 5,081,367 A | 1/1992 | Smith et al. | |
| 5,138,184 A | 8/1992 | Keefe | |
| 5,821,636 A | 10/1998 | Baker et al. | |
| 6,150,736 A | 11/2000 | Brill | |
| 6,204,574 B1 | 3/2001 | Chi | |
| 6,259,171 B1 | 7/2001 | Cheng | |
| 6,608,264 B1 | 8/2003 | Fouladpour | |
| 6,653,749 B2 | 11/2003 | Delbridge | |
| 6,747,369 B2 | 6/2004 | Griffith et al. | |
| 2003/0227785 A1 | 12/2003 | Johnson, Jr. | |
| 2004/0036359 A1 | 2/2004 | Griffith et al. | |
| 2004/0189099 A1 | 9/2004 | Wild | |
| 2005/0073199 A1 | 4/2005 | Jenkin | |

OTHER PUBLICATIONS

World Intellectual Property Office, Lee W. Young Authorized Officer, "International Search Report and Written Opinion" for PCT/US2008/052119, mailed Jul. 11, 2008 (8 pages). This U.S. application is a national-phase application of PCT/US2008/052119.

*Primary Examiner* — Jared Fureman
*Assistant Examiner* — Carlos Amaya
(74) *Attorney, Agent, or Firm* — Kolisch Hartwell, P.C.

(57) ABSTRACT

A power transfer device (20) is used to transfer an energy consuming device (10) from one A/C power supply (12) to a different A/C power supply (16) without material interruption of the device's operation. In some embodiments, power transfer devices (20) and methods of their use are provided for transferring an energy consuming device (10) from a first power supply (12) to a second power supply (16). In other embodiments, power transfer devices and methods of their use are provided for transferring an energy consuming device (10) from a first power supply (12) to a second power supply (16) when the wiring scheme of the first power supply is uncertain or undetermined.

14 Claims, 4 Drawing Sheets

UNINTERRUPTIBLE A/C POWER SUPPLY TRANSFER UNIT

CROSS REFERENCE TO RELATED APPLICATIONS

This application claims the benefit of and priority under 35 U.S.C. §119(e) to U.S. Provisional Patent Application No. 60/897,292 entitled "UNINTERRUPTIBLE A/C POWER SUPPLY TRANSFER UNIT," filed Jan. 25, 2007, the disclosure of which is incorporated herein by reference.

BACKGROUND

When an energy consuming device, for example a computer, is disconnected from a power supply, its operation may be disrupted long enough for the computer to shut down, go to sleep, or otherwise enter an inactive state. As one remedy to this situation, a computer or other energy consuming device may be connected to an uninterruptible power supply (UPS). As used herein, "uninterruptible" means that, from the viewpoint of the energy consuming device, there is no perceivable or material interruption in the energy consuming device's power supply. In a situation where the energy consuming device is not connected to a UPS, and the energy consuming device is to be moved from its current location, it may be necessary to remove the device from one power supply (e.g. its "original" power supply) and connect it to another (e.g. its "destination" power supply). In such a situation, the energy consuming device is almost certain to shut down, go to sleep, or otherwise become inoperable. Though the device may be restarted, or woken from its sleep, in situations where the device controls access to sensitive information, such a reactivation may require entry of a password to allow further access to the device and/or its contents.

SUMMARY

A power transfer device is disclosed for transferring an energy consuming device from a first A/C power supply to a second A/C power supply. In some embodiments, the power transfer device may comprise: a first power receptacle; a second power receptacle; and a power transfer circuit. The power transfer circuit may be adapted to isolate the first power receptacle from the second power receptacle while the first power receptacle is connected to a first power supply and the second power receptacle is connected to a second power supply. The power transfer circuit may further be adapted to transfer power from the first power receptacle to the second power receptacle upon a loss of power from the second power supply at the second power receptacle.

A power transfer device may include: a power transfer circuit with a switch having contacts, where the power transfer circuit is adapted to be configured to directly connect each of the contacts to a respective one of the first and second power receptacles, and a switch driver responsive to the loss of power at the second power receptacle to maintain the contacts in non-contact configuration while power is at the second power receptacle and to close the contacts when power is lost at the second power receptacle. The power transfer device may further comprise a second switch operable to connect power at the second power receptacle to the first switch, and a second switch driver that drives the second switch, the second switch driver being selectively operable to close the second switch using power from the first power receptacle. The power transfer device may further be configured such that the first switch, when closed, connects power from the second power receptacle to the first switch, and thereby connects the first switch driver to power from the second power receptacle and retains the first switch in a closed state while there is power at the second receptacle. Finally, the power transfer device may utilize a power transfer circuit configured to transfer power from the first power receptacle to the second power receptacle in less than approximately 15 milliseconds after the loss of power at the second power receptacle.

A power transfer device may be configured to be operated selectively in a plurality of predefined operating states. This power transfer device 20 may comprise: a first power receptacle; a second power receptacle; and a power transfer circuit, wherein the power transfer circuit is adapted to transition automatically the power transfer device between a plurality of operating states responsive at least in part to power at the first and second power receptacles. By "automatically" it is meant that the power transfer device is configured to finalize a connection between the first and second power receptacles without further user intervention in response to a change in power at the first and second power receptacles. The operating states in which the power transfer circuit may operate may include a first operating state wherein the first power receptacle is connected to a first power supply and the second power receptacle is connected to a second power supply, and the first and second power receptacles are electrically isolated from each other. A second operating state may include the first power receptacle being connected to the first power supply, the second power receptacle not being not connected to the second power supply, and the first power receptacle being electrically connected to the second power receptacle. During the first operating state, the first and second power receptacles may be maintained in electrical isolation from each other as a result of the power received on the second power receptacle. The power transfer circuit may transition from the first operating state to the second operating state in response to disconnection of the second power supply from the second receptacle.

In some examples, a power transfer device may include: a plurality of switches configured to enable the transition among at least the first and second operating states by forming selectively a power pathway from the first power receptacle to the second power receptacle. At least one of the plurality of switches of the power transfer device may also be part of a self-energizing relay.

A method may be performed for transferring an energy consuming device from a first power supply to a second power supply, where the steps of the method of transferring power may comprise: connecting a first power receptacle to the second power supply; connecting a second power receptacle to an electrical connection device while the electrical connection device is connected to the first power supply and an energy consuming device is connected to the electrical connection device, the energy consuming device thereby receiving power from the first power supply; after connecting the first power receptacle to the second power supply and connecting a second power receptacle to the electrical connection device, disconnecting the electrical connection device from the first power supply; and in response to the disconnection of the electrical connection device from the first power supply, electrically connecting the first power receptacle to the second power receptacle sufficiently rapidly to maintain operation of the energy consuming device.

A method of transfer using a power transfer device may also include: after connecting the first power receptacle to the second power receptacle, connecting the electrical connection device directly to the second power supply; and, after connecting the electrical connection device directly to the second power supply, disconnecting the first receptacle from the second power supply and disconnecting the second receptacle from the electrical connection device. A method of transfer might also further include, in the step of connecting the first power receptacle to the second power receptacle: connecting the first power receptacle to the second power receptacle within approximately 15 milliseconds of the time that the electrical connection device is disconnected from the first power supply. The first power receptacle may be connected to the second power receptacle in less than approximately 10 milliseconds of the time that the electrical connection device is disconnected from the first power supply.

DETAILED DESCRIPTION OF VARIOUS EMBODIMENTS

Figure 1:
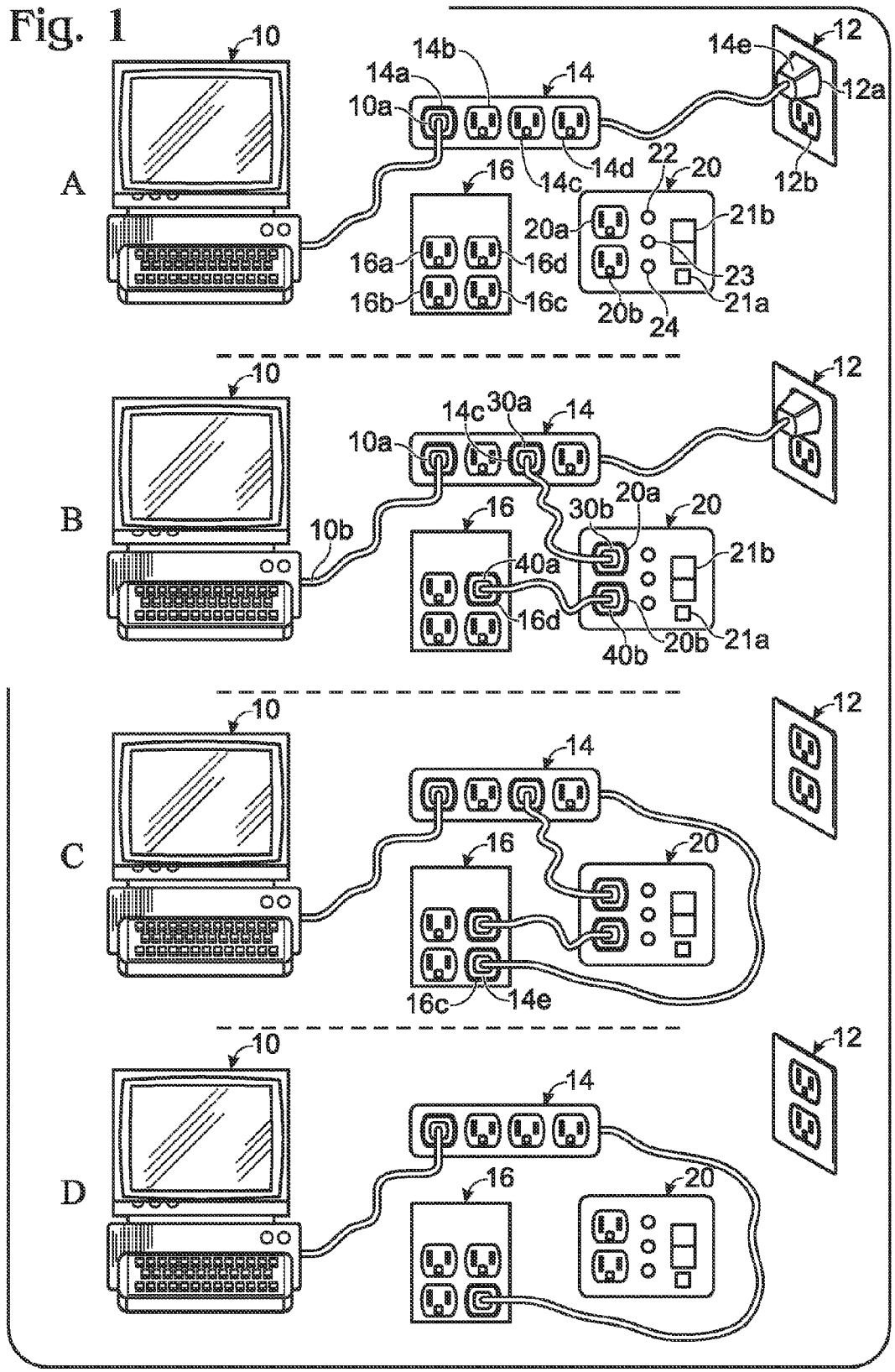
FIG. 1 depicts a method of transferring an energy consuming device from one A/C power supply to another A/C power supply by way of a power transfer device.

A law enforcement authority may desire to perform forensic analysis of a computer at a location remote from its current installation. In such a situation, the law enforcement authority may desire to move quickly, utilizing a hardware system to remove the computer in a manner that keeps the computer awake and powered up. In a case where the computer is already attached to a UPS, removing the computer to a new location may be straightforward. When the computer is not attached to a UPS, it may be desired to place the computer in electrical connection with a UPS, or other relatively stable destination power supply, while simultaneously removing the computer from its original power supply. As well, once the computer, or other energy consuming device, has been moved to its final location, the computer may be transferred from the UPS to a permanently-wired destination power supply in the new location (such as a wall outlet). As used above, the term "simultaneous" (as well as the term "uninterruptible") means that the computer or other target energy consuming device is transitioned from the original power supply to the destination power supply with a short enough transition time that the computer or other energy consuming device does not change its operating state, (such as entering sleep mode or shutting down); the term "simultaneous" does not require truly instantaneous transfer.

Though it may seem straightforward to swap out one power supply for another in a system including an energy consuming device, or tempting to perform a power swap with a standard UPS, a number of obstacles exist when performing a transfer of an A/C power supply with such a device. For example, two power supplies may differ in phase, ground potential, neutral potential, frequency, and/or voltage. Realistically, for properly installed electrical systems, only phase differences may pose a material barrier to performing a transfer of power supplies. A properly designed power transfer device may overcome these problems and may serve to quickly and effectively transfer an energy consuming device from one source of power to another with no interruption in its activity or future operation. A number of embodiments of a suitable power transfer device with power transfer circuitry are described below. In cases where there is little or no doubt about the wiring of an original power supply to be swapped out by a power transfer device for a destination power supply, a single pole version of the power transfer device may be used. Where there is some concern that the original power supply may be wired differently than the destination power supply (e.g. hot and neutral leads may be reversed), a double pole version of the power transfer device may be used in the transfer method. Though described above and below in relation to the transfer of a computer, the power transfer device and method may be used in any situation where a user desires to transfer an operating energy consuming device from one power supply to another.

Referring now to FIG. 1, a method for transferring an energy consuming device 10 from one A/C power supply 12 to another A/C power supply 16 is disclosed. Energy consuming device 10 may be any device utilizing a source of A/C power for its continued operation, and which is sought to be transferred among sources of A/C power. In the disclosed embodiment of FIG. 1, the energy consuming device is a computer sought to be transferred from one A/C power supply to another. In summary fashion, an exemplary method of power supply transfer can be described as: connecting the power transfer device 20 to a destination power supply 16 (either portable or hard-wired); connecting the power transfer device 20 to the energy-consuming device's original power supply 12 (shown as a wall outlet); disconnecting the energy consuming device 10 from the original power supply 12; connecting the energy consuming device 10 to the destination power supply 16; and removing the power transfer device 20 from the system.

The destination power supply 16 and original power supply 12 of the energy consuming device 10 may be connected to the power transfer device 20. In this example, a connection device 14 connects the energy consuming device 10 to the current power source 12. When the connection device is unplugged from the wall outlet, the power transfer device 20 may sense the disconnect operation and switch the energy consuming device 10 to the destination power supply. The switching is a break-before-make-type switching, whose duration is sufficiently short, typically 10 milliseconds or less (but potentially up to about 15 milliseconds), to maintain uninterrupted operation of the energy consuming device. Using break-before-make switching ensures that no phase conflict occurs between the original power supply and the destination power supply. The power transfer device 20 can switch the hot lead (using the power transfer circuit of FIG. 2), or both the hot and neutral leads (using a power transfer circuit of FIG. 3 or 4), depending on the embodiment of the power transfer device 20 used. Based on the design of the power transfer circuit, the transfer between power supplies can be performed multiple times (e.g. moving sequentially from one power supply to another) or performed in reverse (e.g. from the original power supply to the destination power supply, and back).

Part A of FIG. 1 shows an example of a system in which the power transfer device 20 may be used. An energy consuming device 10, in this case a computer, may be attached to a device that supplies power from its original power supply (in this case, a wall outlet carrying power from a city's utility grid or other local source) via a connection device, such as a power strip, as shown, another type of multi-outlet electrical connection device, an outlet like the illustrated outlet representing a connection point to the power source, or an electrical cord. A destination power supply 16, for example a UPS, may be located nearby. A power transfer device 20 may be placed in proximity to the energy consuming device 10, an outlet 12 of the original power supply, and the destination power supply 16. Although the energy consuming device 10 is shown as being connected to a power strip, it is possible that the energy consuming device may be connected directly to a wall outlet 12 or even to the electrical cord 10b of the computer; the transfer procedure described below is capable of being performed in any case.

The power transfer device 20 may have a set of controls with which it may be operated. The power transfer device 20 may include a master power switch 21b that controls the flow of electricity into the power transfer device 20 from the destination power supply. Master power switch 21b may be configured with an indicator that indicates the power status of the power transfer device 20, such as a lamp that may be illuminated when the power transfer device 20 is connected to an active destination power supply. The power transfer device 20 may also include a mode switch 21a that is used to transition a power transfer circuit in the power transfer device 20 from its initial standby, or ready, state to an arm state, and then back to the ready state. The power transfer device 20 may also include a set of indicators, such as neon lamps, to indicate the operating state of the power transfer circuit in the power transfer device 20 at any moment in time. In the illustrated embodiment, the indicators are a series of a yellow lamp 22, a green lamp 23, and a red lamp 24. Finally, the power transfer device 20 may include an outlet 20a for connection to the original power supply 12 and an outlet 20b for connection to the destination power supply 16 (such as a UPS).

Part B of FIG. 1 shows that the power transfer device 20 may be connected via the two ends 40a and 40b of an electrically-conducting cord to an available outlet 16d of destination power supply 16; any compatible electrical outlets may be used, so long as an active electrical connection may be maintained between the power transfer device 20 and the destination power supply 16. Connecting the power transfer device 20 to the original power supply requires that the power transfer device 20 be placed electrically between the energy consuming device 10 and its original power supply 12, which is generally a wall outlet. In cases where the energy consuming device 10 is plugged into a power strip or other electrical connection device 14, the power transfer device 20 may be connected to an open, common outlet on the strip, such as outlet 14e, via the two ends 30a and 30b of an electrically-conducting cord. This step of the method, then, involves configuring the power transfer device 20 so that it is in electrical communication with both the original power supply 12 currently serving the energy consuming device, and to a destination power supply 16 (such as a UPS) to which the energy consuming device will be transferred.

In cases where energy consuming device 10 is plugged directly into a wall outlet 12, or into a electrical connection device (such as an extension cord) not having a spare outlet between the power supply and the energy consuming device 10, a "plug capture device" may be used to connect the power transfer device to the pins of plug 14e without removing the plug from the outlet. A plug capture device may be any device that can slide between a plug 14e and the wall outlet 12 and make electrical connections between the power transfer device 20 and the pins of plug 14e, all without disrupting electrical flow from the original power supply 12 to the energy consuming device 10. When the plug is unplugged from the wall outlet, the plug capture device remains physically and electrically connected to the plug, which allows the power transfer device 20 to power the plug from the destination power supply. Different plug types may require different plug capture devices.

As another alternative, the power supply cord 10b for the energy consuming device 10 may be pierced at a location between the original power supply 12 and the energy consuming device 10, with one end of the power cord (e.g. plug 30a) for the power transfer device 20 being tapped directly into the wires of the energy consuming device's power cord. Examples of appropriate piercing clips for this use are Insulation Piercing Maxigrabber™ test clips from Pomona Electronics. Other piercing clips or methods of tapping may be used as appropriate.

Part C of FIG. 1 shows that placing the power transfer device 20 electrically between the original power supply and the destination power supply may allow the original power supply to be made inactive. In the illustrated embodiment, the original power supply may be made inactive by unplugging the power strip from the wall outlet and plugging it, via its power strip plug 14e, into a free outlet, such as outlet 16c, on the UPS. In other embodiments, the energy consuming device's cord may be removed from the wall outlet 12 and placed into an outlet 16c on the UPS. Once the original power supply is made inactive, a power transfer circuit (e.g. circuit 100, 200, or 300) of the power transfer device 20 may rapidly reroute the electrical flow such that power for the energy consuming device 10 that used to be provided by the original power supply is now provided by the destination power supply. As the flow of electricity in the system may once have run from the power strip, through the power transfer device 20 to the destination power supply (Part B of FIG. 1) but now runs from the destination power supply 16, through the power transfer device 20, to the energy consuming device 10 when electrical connection device 14 is unplugged (Part C of FIG. 1), this rerouting of electrical flow can be thought of as a feeding back of power into the system. This step involves poising the power transfer circuit to feed power from a first power receptacle (connected to the destination power supply) to a second power receptacle (connected to the "original" power supply), deactivating the original power supply (by, for example, unplugging it from the wall), and feeding power from the first power receptacle to the second power receptacle via the power transfer circuit (once the original power supply is unplugged).

Part D of FIG. 1 shows that once the ultimate power supply plug (e.g. plug 14e or 10a) for the energy consuming device 10 has been connected to the destination power supply, the power transfer device 20 may be removed from the system, with the result being that power is supplied from the destination power supply to the energy consuming device 10, replacing the "original" power supply.

Importantly, the above-described method allows the introduction of a destination power supply into a system in which it did not previously exist, without a disruptive loss of power to energy consuming device 10 and no interruption in the performance of energy consuming device 10. In cases where energy consuming device 10 might halt operation or go to sleep in response to an extensive disruption of its power supply, the above-described method, using the below-described power transfer circuit, may prevent the energy consuming device 10 from entering sleep or shutdown mode. Preventing energy consuming device 10 from entering sleep or shutdown mode may, in turn, prevent establishment of password protection of the energy consuming device 10.

In a typical embodiment, power transfer device 20 may be realized in a portable form factor rather than a fixed installation, though a fixed installation may in some circumstances be appropriate. In a portable embodiment, a power transfer circuit (e.g. circuit 100, 200, or 300) may be part of a power transfer device 20 that is constructed of a material that is strongly resistant to the elements and which is electrically isolated from its surroundings; such a construction may protect the power transfer circuit from destruction by water, etc., and a user from electricity passing through the power transfer circuit.

Figure 2:
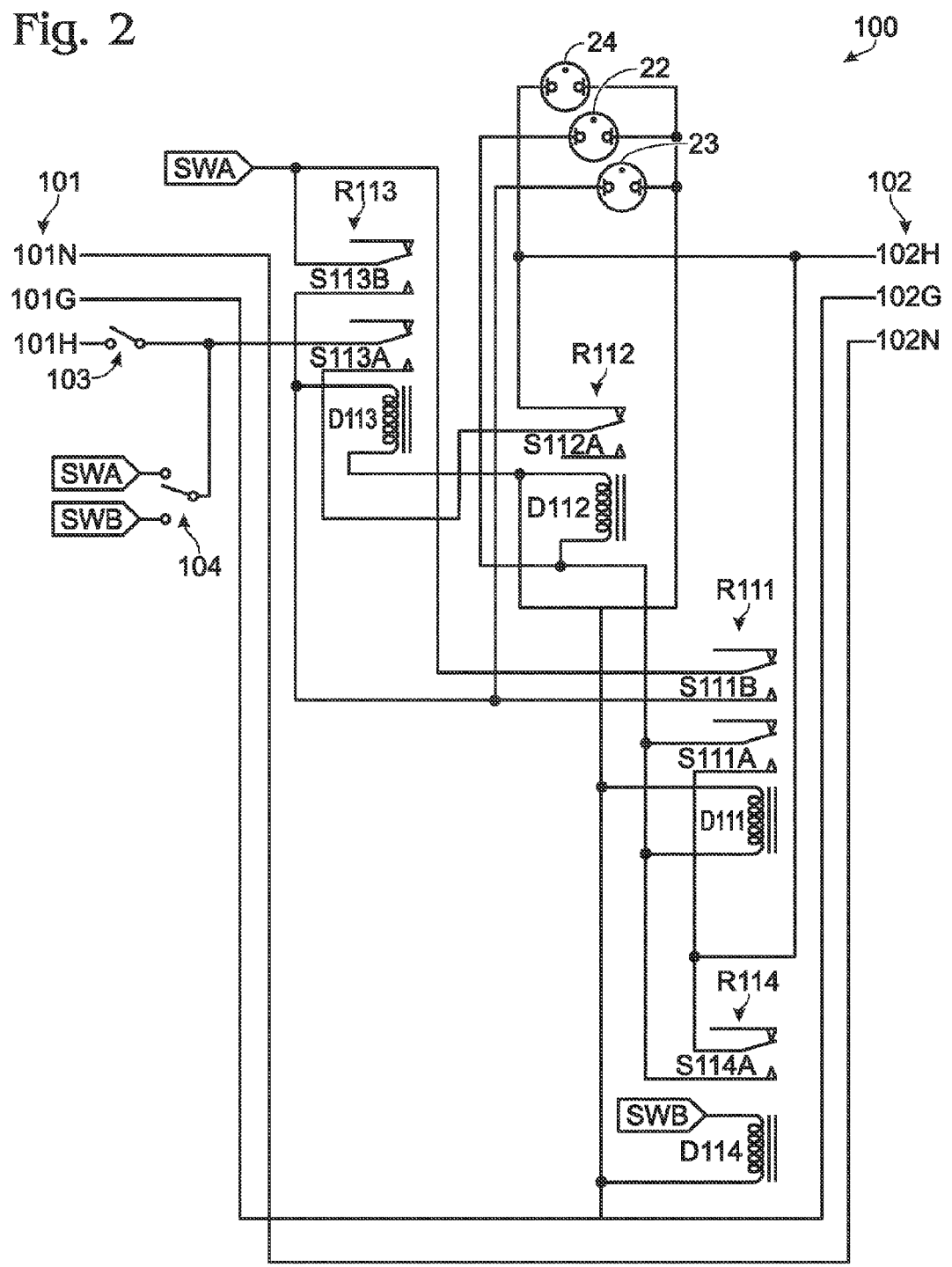
FIG. 2 depicts a first embodiment of a power transfer circuit for use in a power transfer device.
Figure 3:
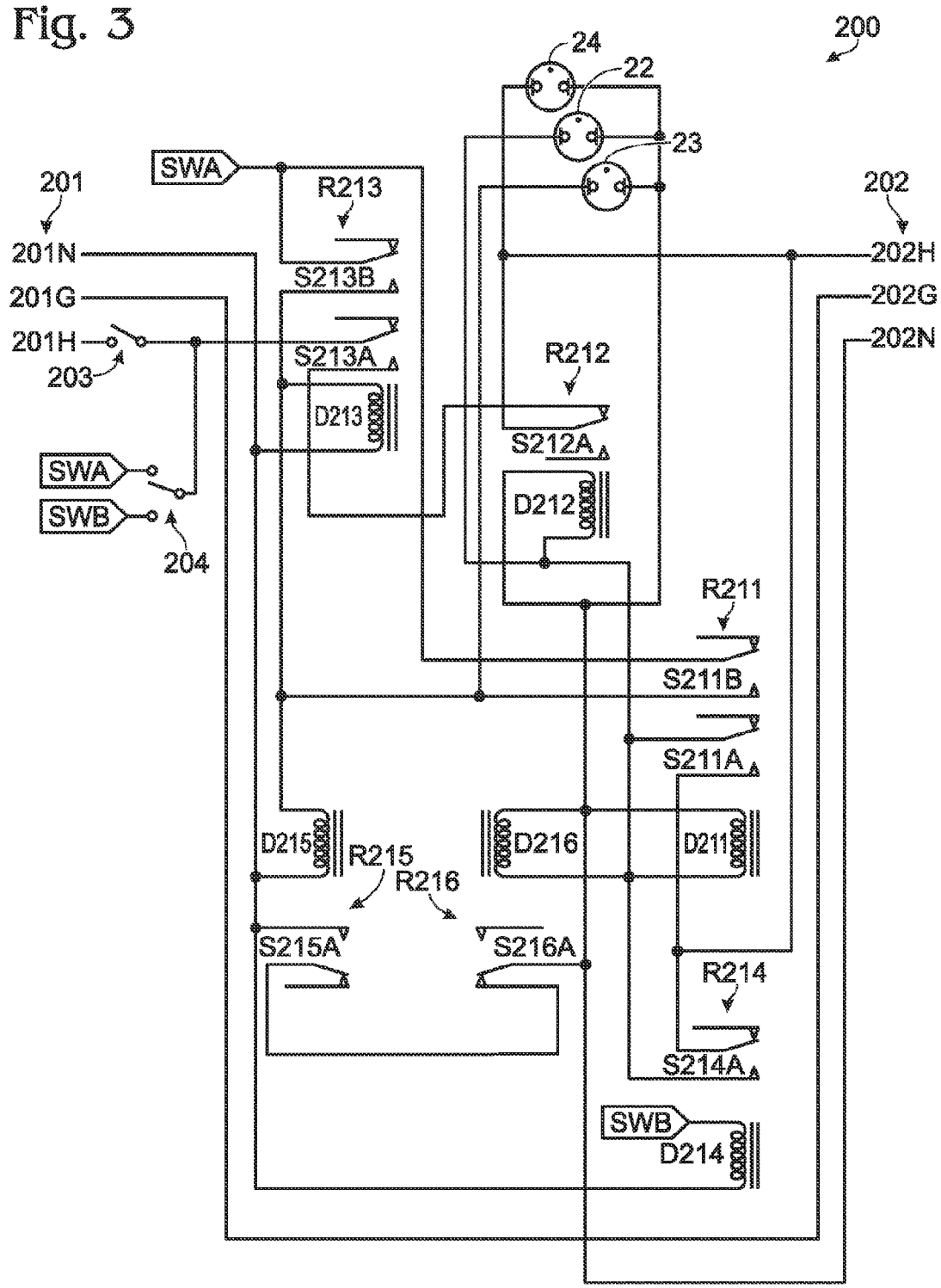
FIG. 3 depicts a second embodiment of a power transfer circuit for use in a power transfer device.
Figure 4:
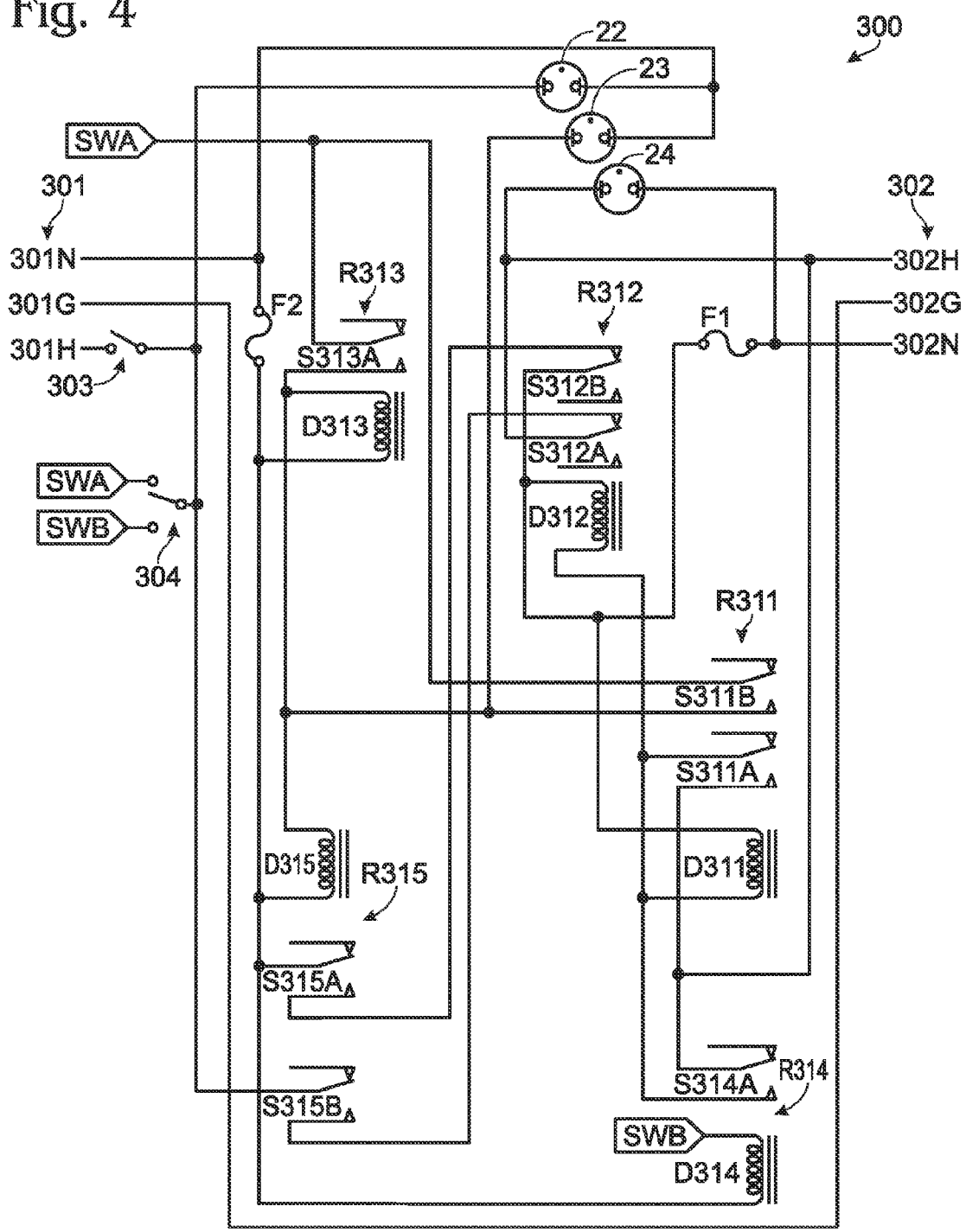
FIG. 4 depicts a third embodiment of a power transfer circuit for use in a power transfer device.

Referring to FIG. 2, in this example, a power transfer device 20 may include a power transfer circuit with a number of relays configured to control the flow of electric current within the power transfer circuit. Examples of such circuits incorporating such relays are illustrated in FIGS. 2-4. Each relay in a circuit (e.g. relay R111) can be thought of as having a switch driver (e.g. D111 of R111) configured to control the position of one or more switches (e.g. S111A and S111B driven by D111). As discussed below, a switch is understood to be "open" when it is not part of a continuous electrical circuit; a switch is understood to be "closed" when it forms part of a continuous electrical circuit. The power transfer device 20 may include an input receptacle 101, 201, or 301 (depending on the embodiment), an output receptacle 102 (or 202, or 302), and a power transfer circuit (100, 200, or 300, depending on the embodiment) adapted to isolate the input and output power receptacles while the input receptacle is connected to a first power supply and the output receptacle is connected to a second power supply. A power transfer circuit of the power transfer device 20 is adapted to transfer power from the first power receptacle to the second power receptacle upon a loss of power at the second power receptacle. To perform this function, the power transfer circuit may include at least a first switch configured to make an electrical connection between the input and output receptacles (e.g. S112A, or S212A, or S312A), operated by a switch driver (e.g. D112, or D212, or D312), and a control device (embodied in the present disclosure by the other elements of power transfer circuits 100, 200, and 300).

FIG. 2 shows a single-pole embodiment of a power transfer circuit. As seen in FIG. 2, the power transfer circuit 100 of the power transfer device 20 may derive a portion of its power from the destination power supply's hot, neutral, and ground leads (101H, N, and G, respectively) and a portion from the original power supply's hot, neutral, and ground leads (102H, N, and G, respectively). Power from the destination power supply is switched using a combination illuminated switch and circuit breaker 103, which is an example of a master power switch 21b seen in FIG. 1. A mode switch 104 (an example of mode switch 21a in FIG. 1) controls energization of a number of relays (R111, R112, R113, and R114), each having a relay driver (e.g. driver D111 for relay R111) that may be energized to control one or more relay switches (e.g. switches S111A and S111B for relay R111). Power for mode switch 104 is taken from a point directly after the power switch. In this base configuration, switch drivers D113 and D114 are inactive, and switches S113A, S113B, and S114A are open (in the NC position), which ensures no power reaches the output receptacle.

Initially, an active destination power supply is connected to an input receptacle providing hot, neutral, and ground contacts 101H, N, and G; an active original power supply is connected to an output receptacle providing hot, neutral, and ground contacts 102H, N, and G. As a default, mode switch 104 is in the ready position SWA when power is first applied to the unit. Because of this, D113 will not energize and not transfer power because D111 has not yet been energized. If mode switch 104 is placed in the arm position SWB when power is applied to the unit, D113 will still be inactive, switches S113A and S113B will be in the open position and, again, no power reaches the output receptacle. To operate the power transfer device 20, mode switch 104 must begin in the ready position SWA, be moved to the arm position SWB, and then returned to the ready position SWA. This design ensures sequential activation of the relays (drives and switches) while maintaining electrical isolation of the receptacles; such a feature prevents the user from energizing the output receptacle before it is connected to the original power supply of the energy consuming device 10 whose power supply is to be transferred.

When the power transfer device 20 is powered at its input and output receptacles, and mode switch 104 is placed in the arm position SWB, D114 is energized, which in turn energizes D111. D111 and S111A in combination then self-energize D111, with S111B energizing D113 and D112. Because an active D112 maintains S112A in an open state (no connection between input and output receptacles), no power is transferred to the output receptacle from the input receptacle. Likewise, if the output receptacle is not connected to an active destination power supply, no relays are energized and no power is transferred to the output receptacle.

Since D111 is self-energized, the states of D111 and D112 remain the same (coupled) when mode switch 104 is moved from arm SWB to ready SWA. Recalling that power is applied at the input and output receptacles, when the mode switch is moved from arm to ready, D113 becomes energized through D111's effect on S111B. Energizing D113, in the ready mode, causes D113 to close switches S113A and S113B and to self-energize so long as the mode switch is maintained in ready position SWA. Since D112 is still energized via the output receptacle and D111, switch S112A is maintained in an open position and no power is transferred to the output receptacle. At this point, the unit is configured and ready to transfer power.

When the power transfer device 20 and its associated power transfer circuit no longer receive power from the original power supply (e.g. a user unplugs the energy consuming device's power supply from the wall), D111 deenergizes, switches S111A and S111B open, and D111 no longer has the capacity to self-energize. D112 also de-energizes, releasing switch S112A from its open position and allowing it to close; this makes an electrical connection between the input and output receptacles and allows the transfer of power (in a "backwards" or "backfeed" manner) from the input receptacle to the output receptacle, since D113 is still in a self-energized state.

Transfer time (the time to make the electrical connection between the input and output receptacles once power is removed from the output receptacle) will be the time it takes for D112 to deenergize; this time is typically 10-15 milliseconds or less. Although this time interval is short enough that the energy consuming device 10 does not notice and react to a loss of power, this momentary short switching time ensures that the input and output receptacles, and their associated power supplies, are never tied together.

Turning the unit OFF disconnects the input receptacle from the output receptacle by deenergizing D113, allowing S113A to open.

In the above transfer sequence, the power transfer device 20 may use a series of indicator lights to aid the user in performing the transfer sequence and to apprise the user of the power transfer device 20's state of operation. For example, red neon lights 24 indicate may indicate when the input and output receptacles are powered. A yellow light 22 may indicate when the unit is in the armed after a user depresses mode switch 104 to arm SWB. A green light 23 may indicate when the power transfer device 20 is ready to be removed from the system, having already transferred power.

FIG. 3 shows a first embodiment of a double-pole design for a power transfer circuit. A double-pole design of the power transfer circuit may be utilized when there is a concern that the original power supply is wired in a reverse manner relative to the destination power supply; the double-pole version has the ability to maintain normal polarity of the original power supply or to reverse the polarity of a miswired original power supply.

The same general theory of operation applies to the double pole version of the power transfer device 20 as applies to the single-pole version discussed above and shown in FIG. 2. However, in the first embodiment of a double-pole power transfer circuit in the power transfer device 20, relay driver D215 is in parallel with relay driver D213 and relay driver D216 is in parallel with relay driver D212. As seen in FIG. 3, the double-pole power transfer circuit, like the single-pole power transfer circuit, may derive a portion of its power from the destination power supply's hot, neutral, and ground leads (201H, N, and G, respectively) and a portion from the original power supply's hot, neutral, and ground leads (202H, N, and G, respectively). Power from the destination power supply is switched using a combination illuminated switch and circuit breaker 203, which is an example of a master power switch 21b seen in FIG. 1. A mode switch 204 (an example of mode switch 21a in FIG. 1) controls energization of a number of relays (R211, R212, R213, R214, R315, and R216), each having a relay driver (e.g. driver D211 for relay R211) that may be energized to control one or more relay switches (e.g. switches S211A and S211B for relay R211). As above for the single mode embodiment, power for mode switch 204 is taken from a point directly after the power switch. This ensures that drivers D213, D215, and D214 not energized, and associated switches S213A, S213B, S215A, and S214A are open when the power switch is OFF. Such a design prevents power from reaching the output receptacle when the input receptacle is powered at the beginning of the transfer process.

Initially, an active destination power supply is connected to an input receptacle providing hot, neutral, and ground contacts 201H, N, and G; an active original power supply is connected to an output receptacle providing hot, neutral, and ground contacts 202H, N, and G. Normally, mode switch 204 is in the ready SWA position when power is applied to the unit. In this case, drivers D213 and D215 will not energize and not transfer power because driver D211 has not yet been energized and has not closed switches S211A and S211B. The same result follows if the unit is turned on with the mode switch in the arm SWB position. To operate the power transfer device 20 effectively, mode switch 204 must be moved from ready position SWA to arm position SWB, and then returned to ready position SWA. This design ensures sequential activation of the relays (drivers and switches) while maintaining electrical isolation of the receptacles; such a feature prevents the user from energizing the output receptacle before it is connected to the original power supply of the energy consuming device 10 whose power supply is to be transferred.

When the power transfer device 20 is powered at its input and output receptacles, and mode switch 204 is placed in the arm position SWB, D214 is energized, which in turn energizes D211 and D216. Driver D211 and switch S211A in combination then self-energize D211, while D216 opens switch S216A. Meanwhile, switch S211B (closed by D211) energizes D212. Because an active D212 maintains S212A in an open state (no connection between the input and output receptacles), no power is transferred to the output receptacle. Likewise, if the output receptacle is not plugged in to an active power supply, no relays are energized and no power is transferred to the output receptacle.

Since driver D211 is self energized, the states of drivers D211 and D212 remain the same (coupled) when mode switch 204 is moved from arm SWB to ready SWA. Recalling that power is applied at the input and output receptacles, when the mode switch is moved from arm to ready, D213 and D215 become energized through D211's effect on S211B. Energizing driver D213, in the ready mode, causes D213 to close switches S213A and S213B and driver D213 to self-energize, so long as the mode switch is maintained in ready position SWA. When energized, driver D215 closes switch S215A but no circuit is made with S216A because of the effect of energized driver D216 (i.e. the loop between S215A and S216A is not closed). Since D212 is still energized via the output receptacle and D211, switch S212A is maintained in an open position and no power is transferred to the output receptacle. At this point, the unit is configured and ready to transfer power.

When the power transfer device 20 and its associated power transfer circuit no longer receive power from the original power supply (e.g. a user unplugs the energy consuming device's power supply from the wall), D211 deenergizes, switches S211A and S211B open, and D211 no longer has the capacity to self-energize. D212 also de-energizes, releasing switch S212A from its open position and allowing it to close; this makes an electrical connection between the input and output receptacles and allows the transfer of power (in a "backwards" or "backfeed" manner) from the input receptacle to the output receptacle, since D213 and D215 are still in self-energized states. As seen in FIG. 3, the hot connection passes through S213A and S212A on its way from input receptacle 201 to output receptacle 202; the neutral connection passes through S215A and S216A.

Transfer time (the time to make the electrical connection between the input and output receptacles once power is removed from the output receptacle) will be the time it takes for driver D212 to deenergize; this time is typically 10-15 milliseconds or less. Although this time interval is short enough that the energy consuming device 10 does not notice and react to a loss of power, this momentary short switching time ensures that the input and output receptacles, and their associated power supplies, are never tied together.

Turning the unit OFF disconnects the input receptacle from the output receptacle by deenergizing D213, allowing S213A to open.

As with the first embodiment, the power transfer device 20 may use a series of indicator lights to aid the user in performing the transfer sequence and to apprise the user of the power transfer device 20's state of operation. For example, red neon lights 24 indicate may indicate when the input and output receptacles are powered. A yellow light 22 may indicate when the unit is in the armed after a user depresses mode switch 104 to arm SWB. A green light 23 may indicate when the power transfer device 20 is ready to be removed from the system, having already transferred power.

As can be determined from the above description, the double-pole power transfer circuit design has the same basic capability as the single-pole power transfer circuit design shown in FIG. 2 and described above; that is, each power transfer circuit can function in a power transfer device 20 to transfer an energy consuming device 10 from one power supply (the original power supply) to another (the destination power supply). However, the double-pole design also is configured to address the situation where the original power supply is mis-wired, such that its hot and neutral leads are reversed relative to the destination power supply. As can be determined from a close examination of FIG. 3, the hot lead from the input receptacle 201 is passed from 201H to switch S213A, while a reverse-wired neutral lead from output receptacle 202 is passed (through 202H) to switch S212A. Thus, a hot lead approaches one end of the isolated segment between switches S213A and S212A, and a neutral lead approaches the other end of the segment. When power is removed from the output receptacle (and switch S212A is closed, completing the circuit), the hot lead from 201H continues through to the formerly neutral 202H, causing it to become a hot lead as well. Similarly, a neutral lead from input receptacle 201 is passed from 201N to switch S215A, while a reverse-wired hot lead from output receptacle 202 is passed (through 202N) to switch S216A. Thus, a neutral lead approaches one end of the isolated segment between switches S215A and S216A, and a hot lead approaches the other end of the segment. When power is removed from the output receptacle (and switch S216A is closed, completing the circuit), the neutral lead from 201N continues through to the formerly hot 202N, causing it to become a neutral lead as well. In this way, what was formerly a reverse-wired output receptacle becomes wired in a common manner with the input receptacle.

FIG. 4 shows a second embodiment of a double-pole design for a power transfer circuit. As seen in FIG. 4, and like the other embodiments, the power transfer circuit 300 of the power transfer device 20 may derive a portion of its power from the destination power supply's hot, neutral, and ground leads (301H, N, and G, respectively) and a portion from the original power supply's hot, neutral, and ground leads (302H, N, and G, respectively). Power from the destination power supply is switched using a combination illuminated switch and circuit breaker 303, which is an example of a master power switch 21b seen in FIG. 1. A mode switch 304 (an example of mode switch 21a in FIG. 1) controls energization of a number of relays (R311, R312, R313, R314, and R315), each having a relay driver (e.g. driver D311 for relay R311) that may be energized to control one or more relay switches (e.g. switches S311A and S311B for relay R311). Power for the mode switch 304 is taken from a point directly after the power switch. This ensures that drivers D313, D315, and D314 are not energized, and associated switches S313A, S315A, S315B, and S314A are open (in the NC position) when the power switch is OFF and that no power passes from the input receptacle to the output receptacle.

Initially, an active destination power supply is connected to an input receptacle providing hot, neutral, and ground leads 301H, N, and G; an active original power supply is connected to an output receptacle providing hot, neutral, and ground leads 302H, N, and G. Normally, mode switch 304 is in the ready SWA position when power is applied to the unit. In this case, drivers D313 and D315 will not energize and not transfer power because driver D311 has not yet been energized and has not closed switches S311A and S311B. The same result follows if the unit is turned on with the mode switch in the arm SWB position. To operate the power transfer device 20 effectively, mode switch 304 must be moved from ready position SWA to arm position SWB, and then returned to ready position SWA. This design ensures sequential activation of the relays (drivers and switches) while maintaining electrical isolation of the receptacles; such a feature prevents the user from energizing the output receptacle before it is connected to the original power supply of the energy consuming device 10 whose power supply is to be transferred.

When the power transfer device 20 is powered at its input and output receptacles, and mode switch 304 is placed in the arm position SWB, D314 is energized, which in turn (via switch S314A) energizes drivers D311 and D312. Driver D311 and switch S311A in combination self-energize D311, while active driver D312 opens switch S312A. Switch S311B is also closed by D311, and its connection is utilized in the next step. Because an active D312 maintains S312A in an open state (no connection between the input and output receptacles), no power is transferred to the output receptacle. Likewise, if the output receptacle is not plugged in to an active power supply, no relays are energized and no power is transferred to the output receptacle.

Since driver D311 is self energized, the states of drivers D311 and D312 remain the same (coupled) when mode switch 304 is moved from arm SWB to ready SWA. Recalling that power is applied at the input and output receptacles, when the mode switch is moved from arm to ready, D313 and D315 become energized through D311's effect on S311B. Energizing driver D313, in the ready mode, causes D313 to close switches S313A and driver D313 to self-energize, so long as the mode switch is maintained in ready position SWA. Energizing driver D313 in the ready mode causes driver D315 to close switches S315A and S315B. Since D313 is self-energized and in turn energizes driver D315, D313 and D315 are coupled, so long as the mode switch is maintained in ready position SWA. When energized, driver D315 closes switches S315A and S315B but no circuit is made to the output receptacle because switches S312A and S312B are maintained in an open position by energized driver D312. No power is transferred to the output receptacle. At this point, the unit is configured and ready to transfer power.

When the power transfer device 20 and its associated power transfer circuit no longer receive power from the original power supply (e.g. a user unplugs the energy consuming device's power supply from the wall), D311 deenergizes, switches S311A and S311B open, and D311 no longer has the capacity to self-energize. D312 also de-energizes, releasing switches S312A and S312B from their open positions and allowing them to close; this makes an electrical connection between the input and output receptacles and allows the transfer of power (in a "backwards" or "backfeed" manner) from the input receptacle to the output receptacle, since D313 is still in a self-energized state. As seen in FIG. 4, the hot connection passes through S315B and S312A on its way from input receptacle 301 to output receptacle 302; the neutral connection passes through S315A and S312B.

As can be determined from the above description, this double-pole power transfer circuit embodiment has the same capability as the double-pole power transfer circuit design shown in FIG. 3 and described above; that is, this double-pole embodiment is configured to address the situation where the original power supply is reverse-wired, such that its hot and neutral leads are reversed relative to the destination power supply. As can be determined from a close examination of FIG. 4, the hot lead from input receptacle 301 is passed from 301H to switch S315B, while a reverse-wired neutral lead from output receptacle 302 is passed (through 302H) to switch S312A. Thus, a hot lead approaches one end of the isolated segment between switches S315B and S312A, and a neutral lead approaches the other end of the segment. When power is removed from the output receptacle (and switch S312A is closed, completing the circuit), the hot lead from 301H continues through to the formerly neutral 302H, causing it to become a hot lead as well. Similarly, a neutral lead from input receptacle 301 is passed from 301N to switch S315A, while a reverse-wired hot lead from output receptacle 302 is passed (through 302N) to switch S312B. Thus, a neutral lead approaches one end of the isolated segment between switches S315A and S312B, and a hot lead approaches the other end of the segment. When power is removed from the output receptacle (and switch S312B is closed, completing the circuit), the neutral lead from 301N continues through to the formerly hot 302N, causing it to become a neutral lead as well. In this way, what was formerly a reverse-wired output receptacle becomes wired in a common manner with the input receptacle.

Transfer time (the time to make the electrical connection between the input and output receptacles once power is removed from the output receptacle) will be the time it takes for driver D312 to deenergize; this time is typically 10-15 milliseconds or less. Although this time interval is short enough that the energy consuming device 10 does not notice and react to a loss of power, this momentary short switching time ensures that the input and output receptacles, and their associated power supplies, are never tied together.

Turning the unit OFF disconnects input receptacle 301 from the output receptacle 302 by deenergizing D313, allowing S313A to open.

As with the first two embodiments, the power transfer device 20 may use a series of indicator lights to aid the user in performing the transfer sequence and to apprise the user of the power transfer device's state of operation. For example, red neon lights 24 indicate may indicate when the input and output receptacles are powered. A yellow light 22 may indicate when the unit is in the armed after a user depresses mode switch 304 to arm SWB. A green light 23 may indicate when the power transfer device 20 is ready to be removed from the system, having already transferred power.

Finally, fuses F1 and F2 may be implemented as protective element in both the hot and neutral legs of the circuit shown in FIG. 4, or in other embodiments of the power transfer circuit. Any appropriate number of fuses may be implemented according to the design of the circuit and desire for safety measures. Also, it should be noted that the power transfer circuit disclosed and described in FIGS. 2-4 need not be used with only one type of target (original) power supply. For example, by changing the coil voltage of the relays, the power transfer device 20 can operate with either 110-120VAC or 208-240VAC systems; use with other systems is possible with the appropriate modifications to the relay voltages.

As discussed above, FIGS. 2-4 show a number of embodiments of power transfer circuits configured to perform the method illustrated in succinct fashion in FIG. 1. As can be seen in FIGS. 2-4, the exemplary circuit diagrams contain a number of switches and relays whose status may change depending on the connections made to the power transfer device 20 and the power status of those connections. Tables 1 and 2, below, give the status of the many switches and relays shown in FIGS. 2-4 under different conditions of connection and power; as shorthand, an activated relay or closed switch is noted with a "+" while an inactive relay or open switch is noted with a "−."

TABLE 1

| Driver | Step ON/Ready | Arm | Arm to Ready | Original A/C off |
|---|---|---|---|---|
| D111 | − | + | + | − |
| D112 | − | + | + | − |
| D113 | − | − | + | + |
| D114 | − | + | − | − |
| D211 | − | + | + | − |
| D212 | − | + | + | − |
| D213 | − | − | + | + |
| D214 | − | + | − | − |
| D215 | − | − | + | + |
| D216 | − | + | + | − |
| D311 | − | + | + | − |

TABLE 1-continued

| Driver | Step ON/Ready | Arm | Arm to Ready | Original A/C off |
|---|---|---|---|---|
| D312 | − | + | + | − |
| D313 | − | − | + | + |
| D314 | − | + | − | − |
| D315 | − | − | + | + |

TABLE 2

| Switch | Step ON/Ready | Arm | Arm to Ready | Original A/C off |
|---|---|---|---|---|
| S111A | − | + | + | − |
| S111B | − | + | + | − |
| S112A | + | − | − | + |
| S113A | − | − | + | + |
| S113B | − | − | + | + |
| S114A | − | + | − | − |
| S211A | − | + | + | − |
| S211B | − | + | + | − |
| S212A | + | − | − | + |
| S213A | − | − | + | + |
| S213B | − | − | + | + |
| S214A | − | + | − | − |
| S215A | − | − | + | + |
| S216A | + | − | − | + |
| S311A | − | + | + | − |
| S311B | − | + | + | − |
| S312A | + | − | − | + |
| S312B | + | − | − | + |
| S313A | − | − | + | + |
| S314A | − | + | − | − |
| S315A | − | − | + | + |
| S315B | − | − | + | + |

The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled. While the above discussion of a power transfer device 20 with a described power transfer circuit consisting of a number of electromagnetic relays, it should be understood that the methods and systems described are equally implemented with other components, such as microprocessor control systems, solid state relays, or any other electronic components suitable for backfeeding power in an electrical system in the described manner.

Accordingly, while embodiments of power transfer circuits in a power transfer device 20 have been particularly shown and described with reference to the foregoing disclosure; many variations may be made therein. Various combinations and sub-combinations of features, functions, elements and/or properties may be used. Such variations, whether they are directed to different combinations or directed to the same combinations, whether different, broader, narrower or equal in scope, are also regarded as included within the subject matter of the present disclosure. The foregoing embodiments are illustrative, and no single feature or element is essential to all possible combinations that may be claimed in this or later applications. The claims, accordingly, define selected embodiments disclosed in the foregoing disclosure. Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A power transfer device comprising:
a first power receptacle;
a second power receptacle; and
a power transfer circuit adapted to isolate the first power receptacle from the second power receptacle while the first power receptacle is connected to a first power supply and the second power receptacle is connected to a second power supply, and to transfer power from the first power receptacle to the second power receptacle upon a loss of power from the second power supply at the second power receptacle.

2. The power transfer device of claim 1, wherein the power transfer circuit includes a switch having contacts and the power transfer circuit is adapted to be configured to directly connect each of the contacts to a respective one of the first and second power receptacles, and a switch driver responsive to the loss of power at the second power receptacle to maintain the contacts in non-contact configuration while power is at the second power receptacle and to close the contacts when power is lost at the second power receptacle.

3. The power transfer device of claim 2, further comprising a second switch operable to connect power at the second power receptacle to the first switch, and a second switch driver that drives the second switch, the second switch driver being selectively operable to close the second switch using power from the first power receptacle.

4. The power transfer device of claim 3, wherein the first switch, when closed, connects power from the second power receptacle to the first switch, and thereby to connect the first switch driver to power from the second power receptacle and to retain the first switch in a closed state while there is power at the second receptacle.

5. The power transfer device of claim 1, wherein the power transfer circuit is configured to transfer power from the first power receptacle to the second power receptacle in less than approximately 15 milliseconds after the loss of power at the second power receptacle.

6. A method of transferring the power supply connected to an electrical connection device from a first power supply to a second power supply, the electrical connection device for connecting an energy consuming device to a power supply, the method comprising:
connecting a first power receptacle to the second power supply;
connecting a second power receptacle to the electrical connection device while the electrical connection device is connected to the first power supply and an energy consuming device is connected to the electrical connection device, the energy consuming device thereby receiving power from the first power supply;
after connecting the first power receptacle to the second power supply and connecting a second power receptacle to the electrical connection device, disconnecting the electrical connection device from the first power supply; and
in response to the disconnection of the electrical connection device from the first power supply, electrically connecting the first power receptacle to the second power receptacle sufficiently rapidly to maintain operation of the energy consuming device.

7. The method of claim 6, further comprising, after connecting the first power receptacle to the second power receptacle, connecting the electrical connection device directly to the second power supply.

8. The method of claim 7, further comprising, after connecting the electrical connection device directly to the second power supply, disconnecting the first receptacle from the second power supply and disconnecting the second receptacle from the electrical connection device.

9. The method of claim 6, wherein connecting the first power receptacle to the second power receptacle includes connecting the first power receptacle to the second power receptacle within approximately 15 milliseconds of the time that the electrical connection device is disconnected from the first power supply.

10. The method of claim 9, wherein the first power receptacle is connected to the second power receptacle in less than approximately 10 milliseconds of the time that the electrical connection device is disconnected from the first power supply.

11. A power transfer device configured to be operated selectively in a plurality of predefined operating states, comprising:
a first power receptacle;
a second power receptacle; and
a power transfer circuit, wherein the power transfer circuit is adapted to transition automatically the power transfer device between a plurality of operating states responsive at least in part to power at the first and second power receptacles, and further wherein the plurality of operating states includes:
a first operating state wherein the first power receptacle is connected to a first power supply and the second power receptacle is connected to a second power supply, and the first and second power receptacles are electrically isolated from each other; and
a second operating state wherein the first power receptacle is connected to the first power supply and the second power receptacle is not connected to the second power supply, and the first power receptacle is electrically connected to the second power receptacle;
wherein the first and second power receptacles are maintained in electrical isolation from each other during the first operating state as a result of the power received on the second power receptacle, and the power transfer circuit transitions from the first operating state to the second operating state in response to disconnection of the second power supply from the second receptacle.

12. The power transfer device of claim 11, wherein the power transfer circuit includes a plurality of switches configured to enable the transition among at least the first and second operating states by forming selectively a power pathway from the first power receptacle to the second power receptacle.

13. The power transfer device of claim 12, wherein at least one of the plurality of switches is part of a self-energizing relay.

14. The power transfer device of claim 12, wherein the first power supply and second power supply are operating out of phase.

* * * * *